(12) United States Patent
Cohen et al.

(10) Patent No.: US 8,305,941 B2
(45) Date of Patent: Nov. 6, 2012

(54) BROADBAND COMBINING SYSTEM WITH HIGH SPECTRUM EFFICIENCY FOR USE IN WIRELESS COMMUNICATIONS

(76) Inventors: Allen S. Cohen, Saddle River, NJ (US);
Dennis Nathan, Saddle River, NJ (US);
Victor Lander, Short Hills, NJ (US)

( * ) Notice: Subject to any disclaimer, the term of this patent is extended or adjusted under 35 U.S.C. 154(b) by 351 days.

(21) Appl. No.: 12/552,702

(22) Filed: Sep. 2, 2009

(65) Prior Publication Data

US 2011/0051628 A1 Mar. 3, 2011

(51) Int. Cl.
*H04B 7/005* (2006.01)
(52) U.S. Cl. ........ 370/278; 370/276; 370/297; 370/328; 455/562; 455/103; 455/450
(58) Field of Classification Search .......... 370/278, 370/276, 297, 328; 455/562, 103, 277.1, 455/450, 273, 323, 283
See application file for complete search history.

(56) References Cited

U.S. PATENT DOCUMENTS

| 5,008,956 | A | * | 4/1991 | Hemmie | 455/318 |
| 5,087,922 | A | * | 2/1992 | Tang et al. | 343/814 |
| 5,854,986 | A | * | 12/1998 | Dorren et al. | 455/562.1 |
| 7,236,807 | B1 | * | 6/2007 | Shapira et al. | 455/562.1 |
| 2004/0023631 | A1 | * | 2/2004 | Deutsch et al. | 455/283 |
| 2004/0116094 | A1 | * | 6/2004 | Eastwood | 455/323 |
| 2006/0199592 | A1 | * | 9/2006 | Bednekoff et al. | 455/450 |
| 2007/0253466 | A1 | * | 11/2007 | Jones et al. | 375/131 |
| 2010/0195568 | A1 | * | 8/2010 | Iimori | 370/328 |

* cited by examiner

*Primary Examiner* — Michael Thier
*Assistant Examiner* — Jamal Javaid
(74) *Attorney, Agent, or Firm* — Sofer & Haroun, LLP

(57) ABSTRACT

A system for combining a plurality of signals in a wireless communication device employs a plurality of base station duplexers each coupled to a corresponding base station from a plurality of collocated base stations, each base station capable of receiving and transmitting signals in accordance with a corresponding transmission protocol. Each duplexer includes a transmit and receive paths for allowing signals to be transmitted from the base station and further allowing signals to be received by the base station. Isolators are each coupled to a corresponding one of the transmit path of each of the duplexers. Bandpass filters are each coupled to an output port of a corresponding one of the isolator and a combiner receives signals provided by each one of the band pass filters. An antenna duplexer is coupled to an output port of the combiner via a transmit path, where the duplexer provides a combined signal of the collocated base stations to an antenna. The duplexer further includes a receive path for providing signals received by the antenna to a corresponding receive path of each of the base station duplexers.

13 Claims, 9 Drawing Sheets

BROADBAND COMBINING SYSTEM WITH HIGH SPECTRUM EFFICIENCY FOR USE IN WIRELESS COMMUNICATIONS

BACKGROUND INFORMATION

1. Field of Invention

The present invention generally relates to wireless communication devices that are configured to provide for combined operation of a plurality of wireless protocols covering different parts of the frequency spectrum, and more particularly for transmitting LTE (long term evolution mode), CDMA (code division multiple access), UMTS (universal mobile telecommunications system), and GSM (global system for mobile communications) signals originated from different base stations BTS's (or transceivers) from a common antenna.

2. Description of Related Art

Continuing progress in wireless communications produces new and more sophisticated protocols that provide new services, which were not previously available. Implementation of these new technologies requires their collocation with the old base station technologies that are currently in use on the same site.

There are three commonly used methods for adding new services (e.g., LTE, UMTS, or WCDMA) to existing sites with existing BTS equipment (e.g. GSM or CDMA). The first method is to install additional antennas on the tower and run new feeder cables to connect to the new base station that is providing the new services (LTE, UMTS or WCDMA). This simple method results in additional tower loading that may require significant expense. In many cases, the incremental costs can be prohibitive or the addition of feeders and antenna's may be simply physically impossible. This is especially true at sites where several carriers are collocated.

The second method, which is widely used in the industry, utilizes multi-port hybrid combiners with operating bandwidths wide enough to accommodate the operation of the new services (LTE, UMTS or WCDMA channels) and existing services (GSM or CDMA channels). The drawback of this method is the significant insertion loss which is typically proportional to the number of channels connected to the corresponding ports of the combiner. These losses are caused by the non-coherent nature of the independent RF power sources (channels) connected to the hybrid combiner's input ports. As a result, most of the power is dissipated in the internal loads of the combiner which results in a significant loss of coverage at the site.

The third established method utilizes Multi-Channel Power Amplifier (MCPA) technology to combine multiple transmitters onto a common feeder line. The gain of this amplifier compensates for the losses of the hybrid combining which typically occurs ahead of the MCPA. However, in order to satisfy the linearity and power requirements of this type of operation, MCPA's must implement sophisticated linearization techniques including predistortion and/or feed-forward technologies, which make them complex and cost-prohibitive.

SUMMARY OF INVENTION

The present invention alleviates significant disadvantages of existing combining methods and provides for single antenna operation from multiple BTS's with different communication protocols co-located at the same site.

In exemplary embodiments, the present invention provides a system and a method for low loss and cost efficient combining of transmit and receive signals from multiple base stations, BTS's (or transceivers) with different protocols, operating at different frequency segments on the same antenna. For example, in accordance with one embodiment which is applicable for combining of two and more base stations on a single antenna, an arrangement is provided that uses a combination of a multi-branch reactive combiner, isolator, band-pass filters, and duplexers interconnected to form a multiplexer. This configuration utilizes the isolation properties of the multi-branch reactive combiner when presented with an impedance value close to a short or open circuit. In this case, the transformation properties of the combiner, which have a certain electrical length at each branch, create a very high impedance at the common junction for all other branches. This provides high isolation among each of the inputs to the junction.

In accordance with another embodiment, which is recommended for combining of small number of base stations (BTS's), an arrangement is provided, which uses a combination of circulators and band pass filters interconnected in a duplex or triplex configuration. This embodiment eliminates the use of multi-branch reactive combiner and reduces the number of band pass filters required. For example, for a two-BTS combiner, only one programmable band pass filter (BPF) is needed.

The employed multiplexer in accordance with various embodiments, can use identically tuned broad band duplexers, except that the common duplexer must be able to operate at the combined peak and average power of all the BTS's (or transceivers). The common Tx/Rx port of the first duplexer is externally connected to the antenna, the common Tx/Rx port of the second duplexer is externally connected to the first BTS, and the common Tx/Rx port of the third duplexer is externally connected to the second BTS, and the common Tx/Rx port of the N+1 duplexer is externally connected to the Nth BTS (or transceiver).

Furthermore, in accordance with various embodiments, the signals from the first BTS (or transceiver) enter the first input port of the module. The second duplexer separates the Tx and Rx signals, and the Tx signals pass through the first isolator oriented in forward direction, then to the band pass filter which is tuned to the Tx frequencies of the first BTS. The signals then pass to the first port of the reactive combiner (a first exemplary embodiment) or to the first port of circulator (a second exemplary embodiment) oriented for propagation in the forward direction and will propagate through the circuit with minimum insertion loss to the output ports of the reactive combiner or circulator connected to the Tx port of the output duplexer, and then to the common (antenna) port of the module.

In one embodiment, which utilizes a reactive combiner, the system has the first connecting branch of the combiner connected to the second port of the band pass filter (BPF). Each BPF has its' pass band tuned to the Tx frequency band of the specific BTS (or transceiver) to which it is connected. This filter rejects the Tx frequencies of all other BTS's, essentially presenting a short or open circuit impedance to these signals. The signals from a BTS connected to a specific branch will propagate through the junction port with very low insertion loss and, with properly selected electrical lengths of the branches, will see a very high impedance at other branches. Because of this very high impedance, each branch has very low power dissipation at its load from all other branches, thus providing high isolation between TX signals from the different BTS's. Isolators at each Tx port of the duplexers provide additional isolation between the sources. With proper filter tuning and the correct electrical length of combiner branches, all Tx signals are combined at the common port of the combiner with low loss and directed to the common antenna via the Tx port of the first duplexer.

In another embodiment the system employs three-port circulators instead of the reactive multi-branch combiner. This embodiment has the advantage of reducing the number of band pass filters required to N−1. However, it has diminishing returns as the number of Base Stations (or transceivers) increases. As N increases, there is a proportional increase in insertion loss as the Tx signals must pass through more circulators. Therefore the discussion below is limited for combining of two BTS's, which is the optimum number for this embodiment.

In this configuration, the first port of the circulator is connected to the first band pass filter, the second port of the circulator is connected to the output of the second isolator, which in turn is connected to Tx port of the third duplexer. The third port of said circulator is connected to the Tx port of the first duplexer and serves as a common port for the output for the transmit signals from both BTS's (or transceivers). The signal from the second collocated BTS (or transceiver) will be directed by the circulator to the Band Pass Filter via the first port of said circulator. Since the BPF will be tuned to the pass band frequency of the first BTS, the signal from the second BTS will be almost completely reflected by said filter and redirected to the third port of the circulator, thus realizing duplexing properties of the module.

In summary and in accordance with various embodiments of the invention all external interfaces are internally connected to certain ports of different components of the module, including broad band duplexers, broad band ferrite isolators, fixed frequency or programmable band pass filters, multi-port reactive combiner assembly, or 3-port circulators. Said components are arranged such that the output signals from $O_1$ to $O_n$ emitted from the common output port are related to corresponding input signals from $I_1$ to $I_n$ applied to individual input ports by the following matrix:

$$\begin{pmatrix} O_1 \\ O_2 \\ ... \\ O_n \end{pmatrix} = \begin{pmatrix} I_1 \\ I_2 \\ ... \\ I_n \end{pmatrix} \begin{pmatrix} T_1 \\ T_2 \\ ... \\ T_n \end{pmatrix} \quad (1)$$

where $T_1 \ldots T_n$ are transmission functions of the circuit for input signals $I_1, I_2, \ldots I_n$ and are close to unity for plurality of In.

In one exemplary embodiment the system utilizes reactive combiners, which require one band pass filter per combined transceiver. This method provides the lowest combing insertion loss. In another exemplary embodiment the system utilizes three-port circulators and requires N−1 band pass filters. This approach is ideal for combining a small number of base stations co-located on the site. For example if only two BTS's are to be combined, only one internal band pass filter is needed.

In accordance with various embodiments the system uses isolators connected to the Tx ports of duplexers as unilateral devices, which allows implementation of filters with lower rejection requirements to achieve required isolation between base stations or transceivers. Simplifying the rejection requirements lowers the number of resonators and coupling elements in the band pass filters. This is especially beneficial when tunable or programmable filters are utilized as the design is simplified, costs are reduced, and the lowest possible insertion loss is realized.

BRIEF DESCRIPTION OF THE DRAWINGS

The present invention can be best understood through the following description and accompanying drawings, wherein.

DETAILED DESCRIPTION

Figure 1:
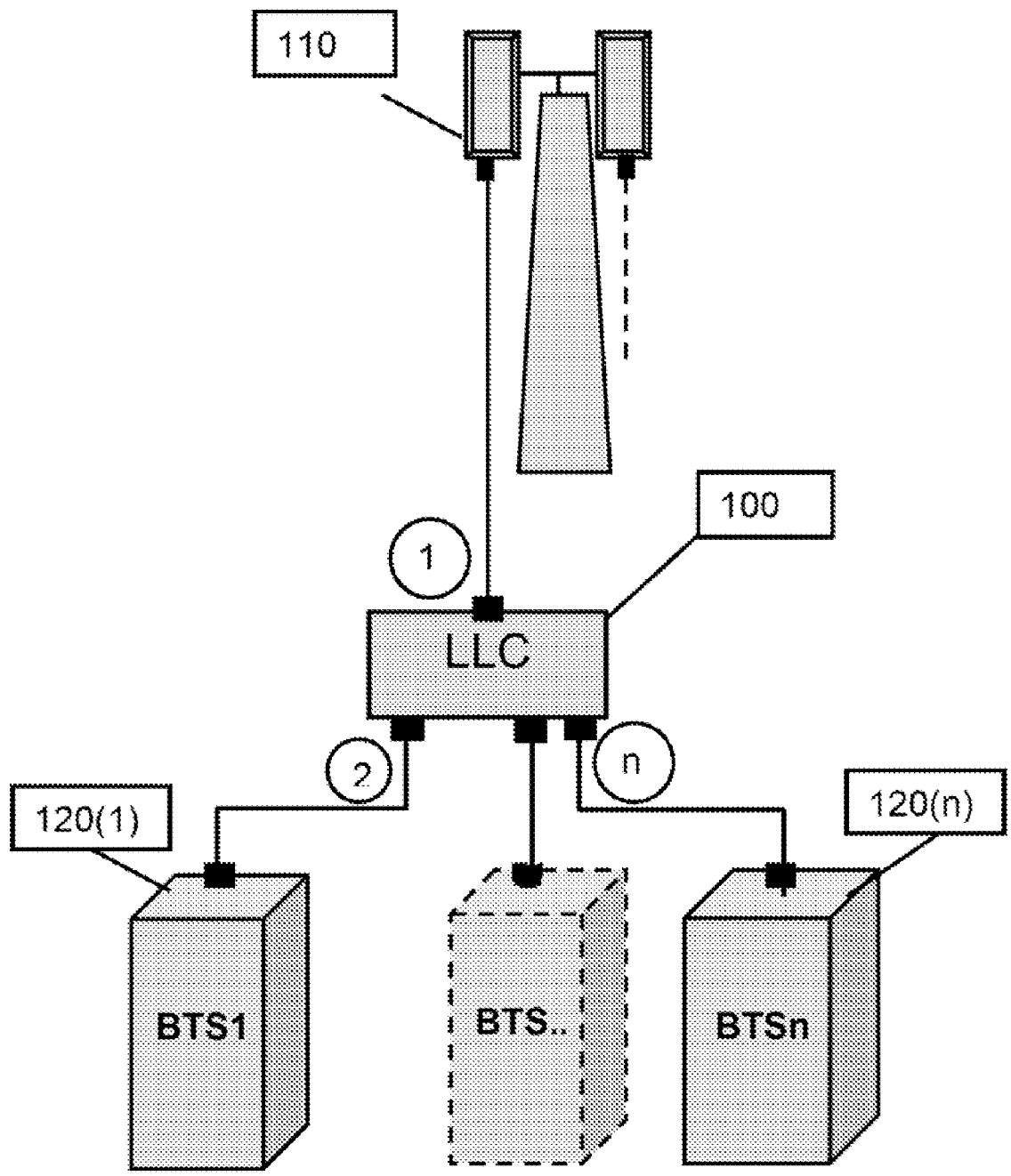
FIG. 1 illustrates a wireless communication system with N base stations (or transceivers) collocated on the same site, in accordance with one embodiment.

FIG. 1 illustrates an exemplary embodiment of a wireless communication system with N base stations (or transceivers) collocated on the same site. The system includes a multiplexer-combiner (LLC) module 100 that allows operation of a number of base stations (transceivers) 120 on the same antenna 110. In this configuration, the Tx/Rx ports of all tranceivers from BTS1 to BTS(N) are connected to the same number of input ports 2 to N correspondingly of the (N+1)-port LLC 100. The output port 1 of the LLC 100 is connected to a common antenna 110 and contains N Tx/Rx signals from all the combined base stations.

Figure 2:
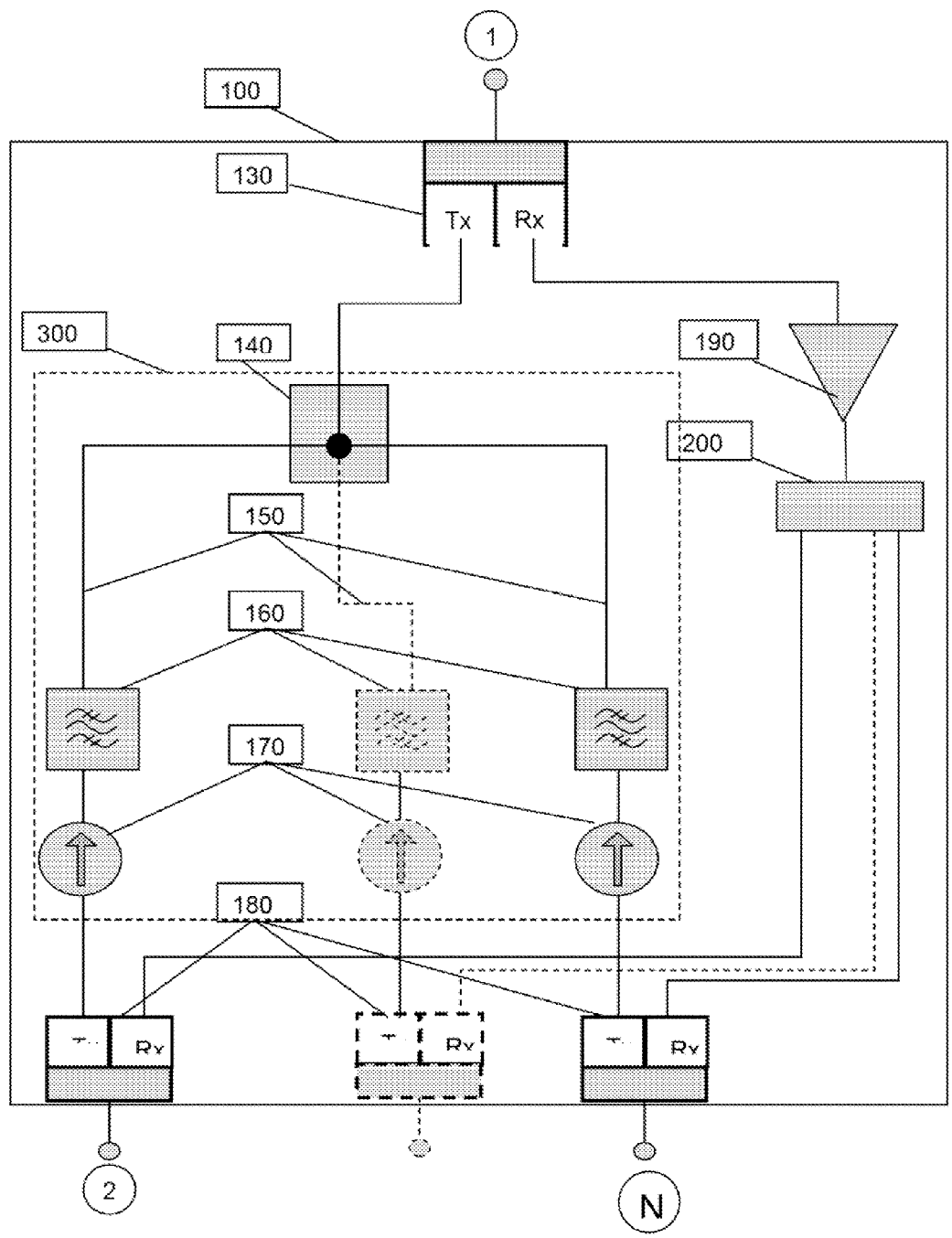
FIG. 2 shows internal connections between different components of multiplexer-combiner (LLC) module 100 in accordance with one embodiment.

FIG. 2 shows internal connections between different components of multiplexer-combiner (LLC) module 100. Multiplexer-combiner module 100 has a common port 1, where all signals from the collocated base station transceivers are combined. Individual ports 2 to N are used to interface with the collocated base station transceivers. The Tx/Rx ports of each base station transceiver is connected to one of the individual input ports of multiplexer-combiner 2 to N, which direct the Tx/Rx signals to N identical broad band duplexers 180 for separate transmit and receive signal processing. The Tx signals are directed by the duplexers to the input ports of isolators 170.

Isolators 170, in accordance with both embodiments, are unilateral ferrite devices and serve the purpose of additional decoupling of the combined base station signals and minimizing the power leakage between the base stations. This is especially applicable in the event that the collocated BTS frequencies are closely spaced with narrow frequency margins between operating pass bands, which leads to limited rejection value produced by the filter and degradation of isolation properties of reactive combiner. For example, in accordance with one embodiment of the invention, the propagation coefficient is substantially limited to 0.95 minimum (leakage losses to 5% or 0.07 dB maximum) and the rejection requirement for the filter is specified to be 15 dB at 5% offset frequency from the corner of the pass band. Such a specification is achieved, for example, by using Chebyscheff filter with 1 dB ripple with five resonators. That means if BTS's with transmit power of 60 W are implemented in the collocated site, approximately 3 W×(N−1) of leakage power can reach the BTS connection port and produce undesirable intermodulation products. Using standard ferrite broad band isolators operating in the same frequency band as BTS's with isolation 20 dB, the leakage can be decreased to several hundred milliwats, which will not produce any noticeable nonlinear effect. Isolators 170 also serve the purpose of presenting constant impedance with good VSWR (Voltage Standing Wave Ratio) to the output of BTS, which is required for the normal operation of BTS output filter. Each isolator also protects the BTS from severe mismatched load in case of the reactive combiner malfunction. In accordance with other embodiments of the invention, a similar goal can be achieved by using BPF's with increased value of rejection parameters for out-of-band frequencies and elimination of the isolators. But that would lead to the increased number of resonators in the filters and added challenges in the design.

The Tx signals are then directed to band pass filters 160 that have a center frequency and pass band equal to the center frequency and bandwidth of the Tx signal of the corresponding base station transmitter. Band pass filters 160 also reject all frequencies located out of the pass band.

Each band pass filter 160 is connected to a reactive combiner 140 via a connecting transmission line 150 of a predetermined length. All of the transmission lines 150 join together and create a common combining port of combiner 140. The combining port of the reactive combiner is connected to Tx port of the output duplexer 130, which is designed for peak and average operating power equal to sum of the corresponding powers of the collocated BTS transceivers. Duplexers 130 and 180 can be broadband, covering the full Tx and Rx operating frequencies of the combined base stations. They must provide enough isolation between transmit and receive ports to avoid excessive desensitization of the receive port by the noise from BTS transmitter in Rx band, and from intermodulation effects caused by the leakage of the high power Tx signal into receive components chain.

FIG. 2, shows distribution of the receive signal Rx coming from the duplexer 130 entering the input port of LNA 190 and then being split by the power divider 200 between Rx ports of the duplexers 180.

Figure 3:
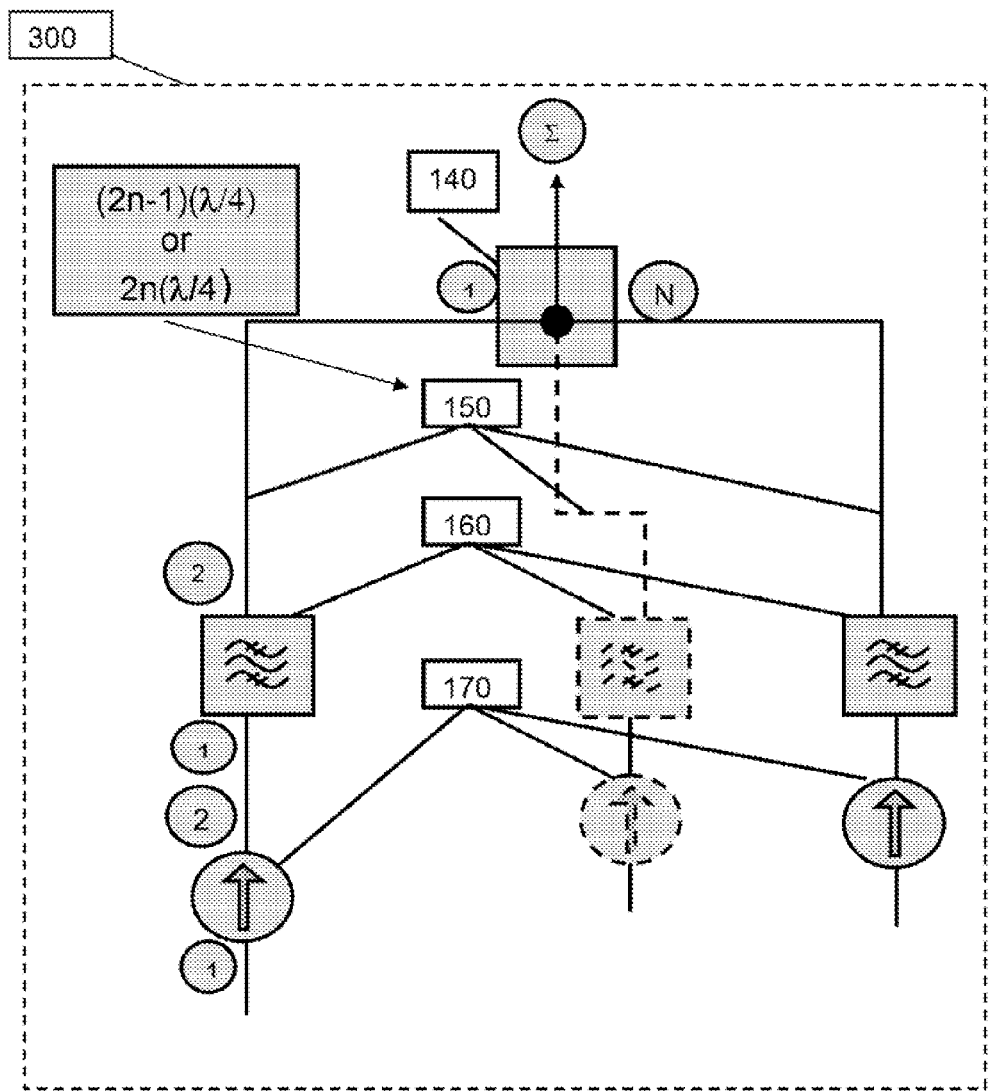
FIG. 3 shows a more detailed diagram of the reactive combiner assembly 300, in accordance with one embodiment.

FIG. 3 shows a more detailed diagram of the reactive combiner assembly 300. It indicates the specific electrical length requirements of the connecting transmission lines. They can be an even or odd number of quarter wavelengths long depending on the type of the filter used in the assembly: even number of quarter wavelengths for filters presenting high impedance for signals out of the pass band, and odd number of quarter wavelengths for the filters presenting low impedance out of the pass band. This figure also details the interconnection of the components connected in series: isolator-filter-reactive combiner-output duplexer. Similar connections exist for each input Tx signal from each of the combined BTS transceivers.

Figure 4A:
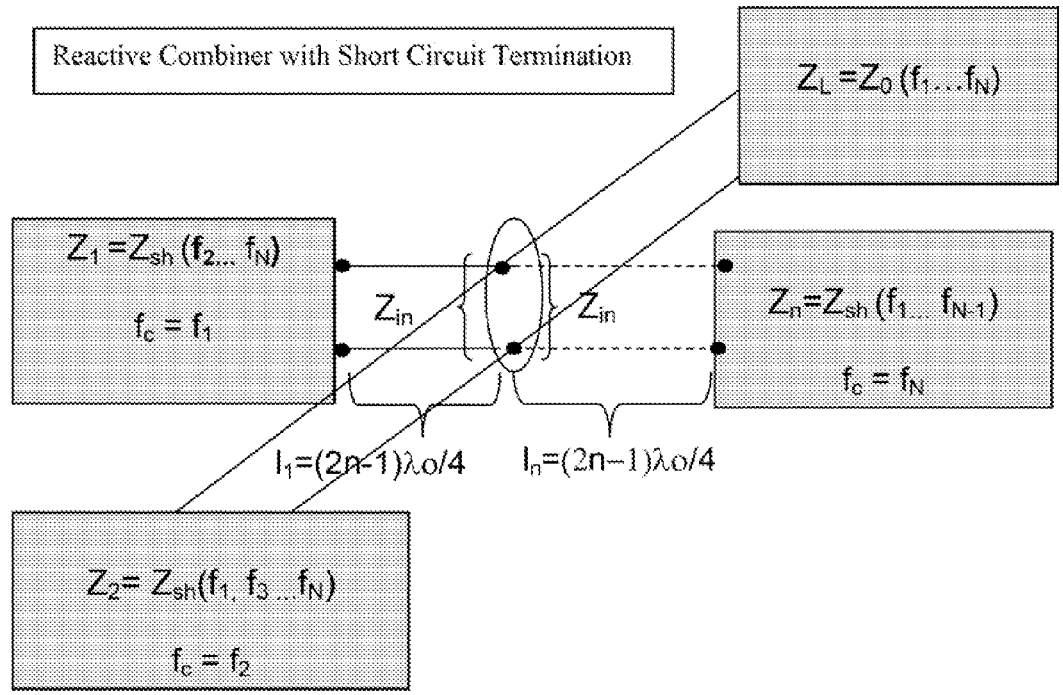
FIGS. 4a and 4b are diagrams of the required impedance loading in the reactive combiner for two types of filters, in accordance with one embodiment.
Figure 4B:
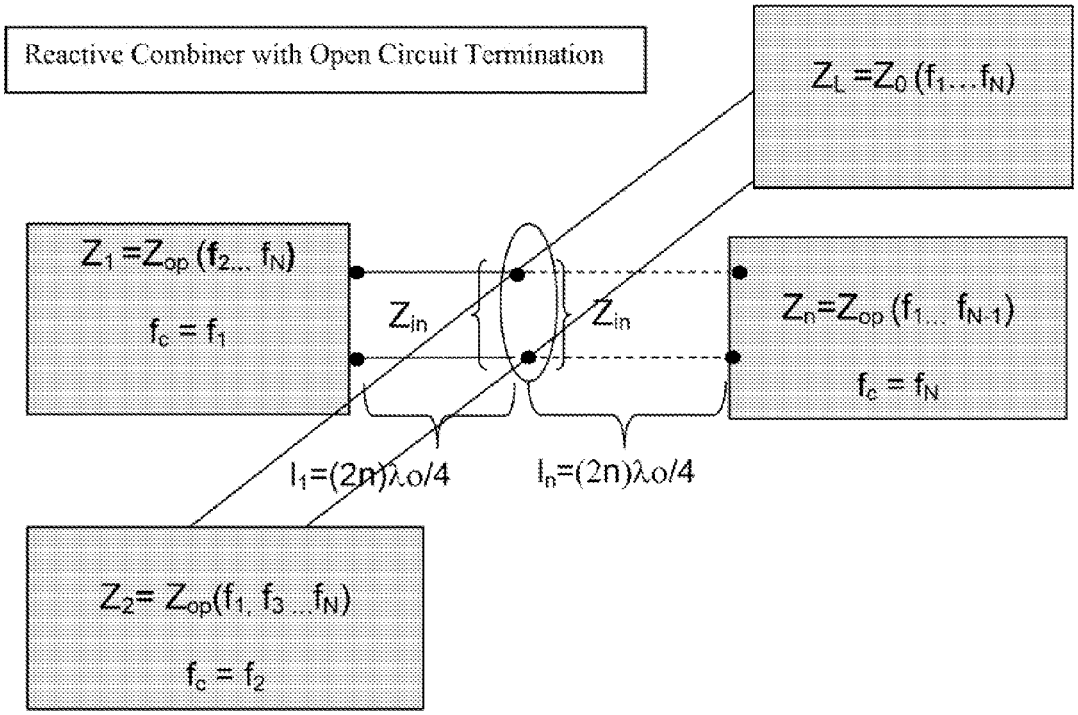

FIGS. 4a and 4b are diagrams of the required impedance loading in the reactive combiner for two types of filters. FIG. 4a demonstrates the impedances presented by neighboring filters to Filter 1, which operates at frequencies that are out of pass band for all other filters. FIG. 2 shows the connections of the outputs of all filters at the common junction point. Therefore the signals from all BTS's propagate via transmission lines 150 and are present at ports 2 of each filter 160 as shown in FIG. 3 as well. With respect to FIG. 4 the following notation is used:

$Z_1, Z_2, \ldots Z_n$ are impedances of each filter (from 1 to N) presented to the operating frequencies of all other filters connected in parallel at the junction point;

$Z_{sh}$ and $Z_{op}$ indicate open or short circuit impedance presented by each filter to the operating frequencies of all other filters; and $Z_L$ is the impedance of the matched output load for the common port of reactive combiner;

$l_1, l_2, \ldots l_n$ is the length of transmission lines between each filter and common junction.

In accordance with various embodiments of the invention, depending on the design of the filters used, each filter can present very high or open circuit impedance (for example, interdigital printed circuit type filters) or very low or short circuit impedance (for example, cavity type filters) at rejection frequencies. Cavity type filters with impedance close to short circuit have been used in this embodiment, but the selection of actual type of the filter depends on the specifics of the site with collocated BTS's and operating frequency band. The operation of various embodiments of the system does not depend on the type of the filter as long as the length of the connecting transmission lines is properly selected.

The value of the impedance of each filter at the pass-band frequencies of other filters has a significant effect on the operation of the reactive combiner. Typically the impedance never has an infinitely small or infinitely large value but usually has a complex nature with certain inductive (for the "short circuit" type) or capacitive (for the "open circuit" type) reactive component. This effect on the performance of the combiner can be easily compensated by adjusting the length of the connecting cables. Typically, for an inductive load, the length can be shortened slightly from the whole number of quarter wavelengths. For a capacitive load, it would be slightly lengthened. In practical applications these deviations are small.

If the frequency margin between operating bands is very small and part of the operating frequency of one or several BTS's falls in the pass band or close to 3 dB pass band of another filter, the filter does not present pure reactive load at the rejected frequency and the transmission line transformers will not realize high impedance at the junction for these frequencies. In this case a filter with steeper frequency rejection slopes must be selected to provide more than 15 dB rejection at undesirable frequencies.

To this end, the impedance at the junction point depends on the type of the termination and the electrical length of the transmission line connecting the filter The transmission line in accordance with various embodiments of the system, can use standard coaxial cables in case of connectorized interconnections, which is typical for coaxial cavity type filters. It also can be a part of printed circuit design if the filters use PC board technology. Actual selection of the type of the filter or transmission line does not affect the scope of this invention.

If the load (created by the other filters at the rejection frequency) is close to a short circuit, then the impedance presented by the parallel connection of N−1 filters to the signals at the pass band for each filter at the common junction is $$Zin'(1) = -j(1/N-1)Z_0 tg\beta 1 = -j(1/N-1)Z_0 tg[(2\pi/\lambda)(2n-1)\lambda/4]; \quad (2)$$

where Zin' (1) is input impedance at the junction presented by any filter with a short circuit at the rejection frequency after transformation;

l is the electrical length from the junction to the filter, which presents short circuit termination;

$\beta=2\pi/\lambda$, propagation constant;

$Z_0$ is characteristic impedance of the transmission line $n \neq 0$ is the number of quarter wavelength segments in electrical length $\lambda=(\lambda_l+\lambda_h)/2$ is the wavelength at the center of the band covering Tx frequency of all BTS In the above expressions $\lambda_l$ is the wavelength that corresponds to the lowest center frequency of the collocated BTS's; $\lambda_h$ is the wavelength that corresponds to the highest center frequency of the collocated BTS's.

Similarly, for the filters with open circuit impedance at rejection frequencies $$Zin''(1)=j(1/N-1)Z_0 \cot \beta 1=j(1/N-1)Z_0 tg[(2\pi/\lambda)2n\lambda/4]; \quad (3)$$

In this equation $\lambda$ is the same as defined above.

where Zin" (1) is the input impedance at the junction presented by any filter with an open circuit at the rejection frequency after transformation. When the l contains the correct number of $\lambda/4$, impedance at the junction presented by filters, which are "tuned out of band" for the operating frequency, becomes very high and there is almost no power leakage between the filters. This can be applied to any filter connected to the combiner, assuming that all filters are sufficiently narrow band and that each of them has high rejection for pass band frequencies of all other filters. In this case the combiner effectively has almost no losses caused by cross-coupling between the arms, which are transmission lines connecting filters to the common junction.

Considering that the propagation coefficient in equation (1) is equal $T=1-(\Gamma)^2$ and $\beta$ is a propagation constant, and considering (2), we can find T for short circuit terminations. In this expression $\Gamma$ is reflection coefficient.

Equations (4) and (5) illustrate the transmission coefficients $T_1(I_1)$ for short and $T_2(I_2)$ open circuit terminations, $$T_1(I_1) = 1 - \left(\frac{-1}{1+2*\tan(2\pi*I_1)}\right) \quad (4)$$

and from (3) for the open circuit terminations $$T_2(I_2) = 1 - \left(\frac{1}{1+2*\tan(2\pi*I_2)}\right) \quad (5)$$

In these formulas $I_1$ and $I_2$ are equal $L/\lambda$, where L is the physical length of the transmission line.

Figure 5A:
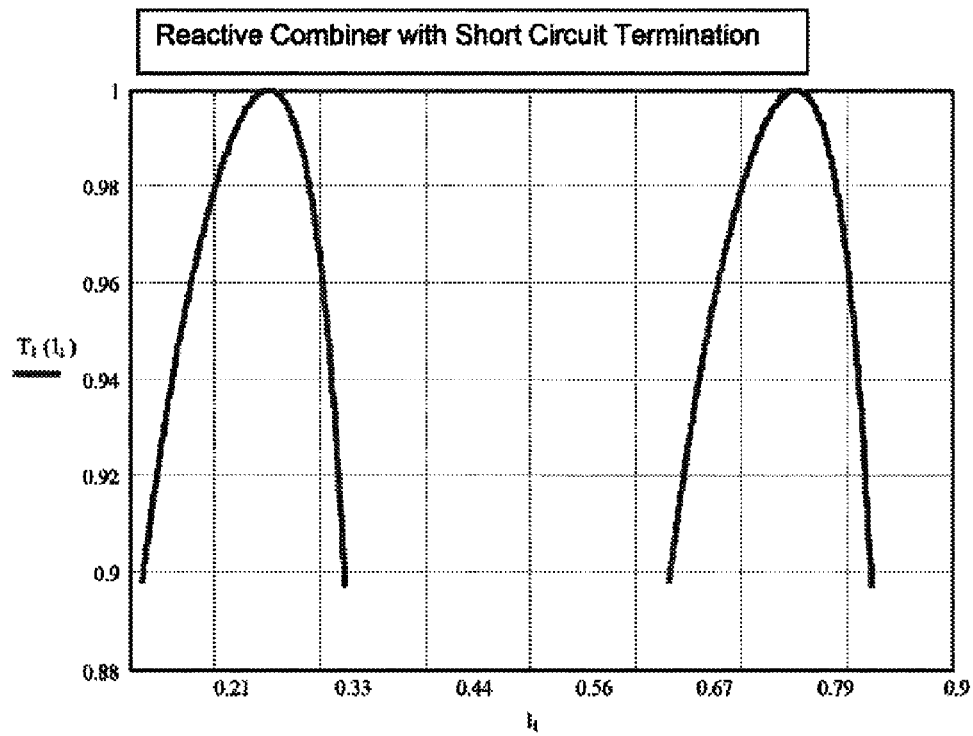
FIGS. 5a 5b show the transmission coefficient for the reactive combiner as a function of the electrical length between the filters with short circuit (FIG. 5a) and open circuit (FIG. 5b) impedance at rejection frequency and common junction, in accordance with one embodiment.
Figure 5B:
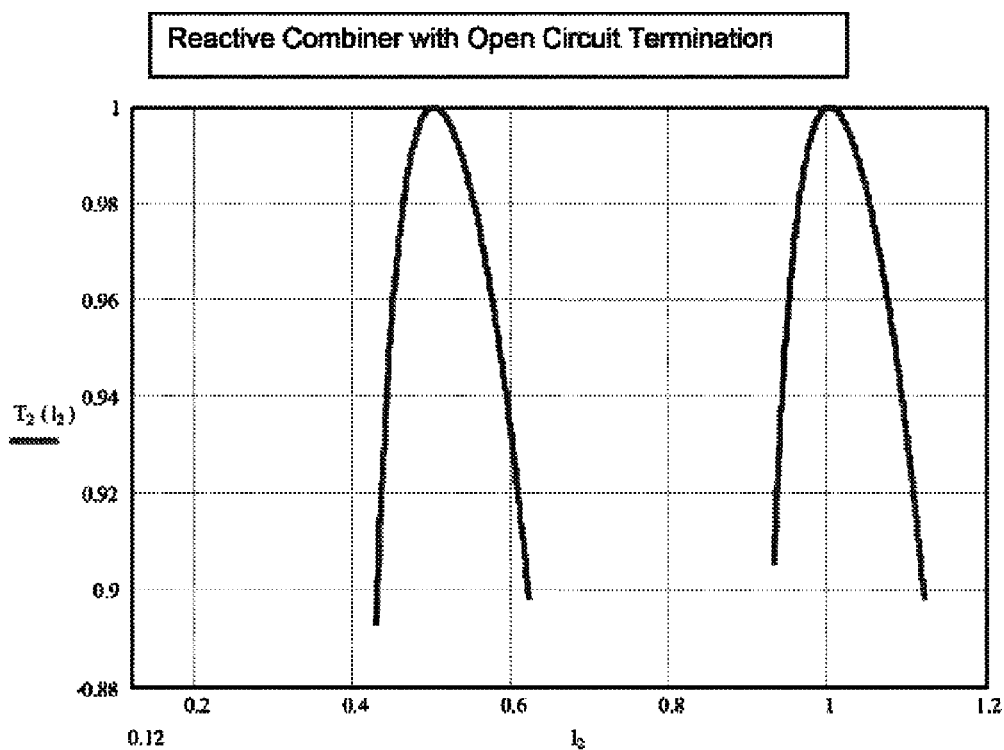

Charts for propagation coefficient calculated using (4) and (5) are shown in FIG. 5. FIG. 5a and FIG. 5b show the transmission coefficient for the reactive combiner as a function of the electrical length between the filters with short circuit (FIG. 5a) and open circuit (FIG. 5b) impedance at rejection frequency and common junction. The Horizontal axis in FIG. 5a and FIG. 5b show the electrical length normalized to the center frequency wavelength. The Vertical axis in FIG. 5a shows the value of the transmission coefficient $T_1$ as a function of the length of transmission line $I_1$ from the short circuit termination to the common junction. The Vertical axis in FIG. 5b shows the value of the transmission coefficient $T_2$ as a function of the length of transmission line $I_2$ from the open circuit termination to the common junction. As it can be expected, the optimal length for the short circuit terminated reactive combiner must be a multiple of $\lambda/4$ (quarter-wavelength) and for the open circuit termination it must be a multiple of (half-wavelength) $\lambda/2$. From that figure, the following table for the bandwidth limited to 10% losses (T>0.9) can be calculated

| Termination | Length of transmission line | Frequency band width for 10% loss |
| --- | --- | --- |
| Short Circuit | $\lambda/4$ | 76% |
| Short Circuit | $3/4\,\lambda$ | 25% |
| Open Circuit | $\lambda/2$ | 40% |
| Open Circuit | $\lambda$ | 19% |

The above table demonstrates that the bandwidth of the reactive combiner is sufficient for wireless communication purposes where the frequency spectrum of the Tx transmissions does not exceed a few percentages from the carrier frequency. This embodiment requires one band pass filter per combined BTS and has the advantage of very low insertion loss, which is mostly determined by the filters frequency characteristics and frequency separation between the nearest combining transmitters. The advantage of this method is that there is no theoretical limit to the number of collocated BTS transceivers that can be combined. With a properly tuned system, all BTS transceivers will experience the same insertion loss with only a small degradation as the number of combining branches increases. The spectral efficiency which will be discussed later for various embodiments is determined by the sharpness of the slopes of the pass band filters.

Figure 6:
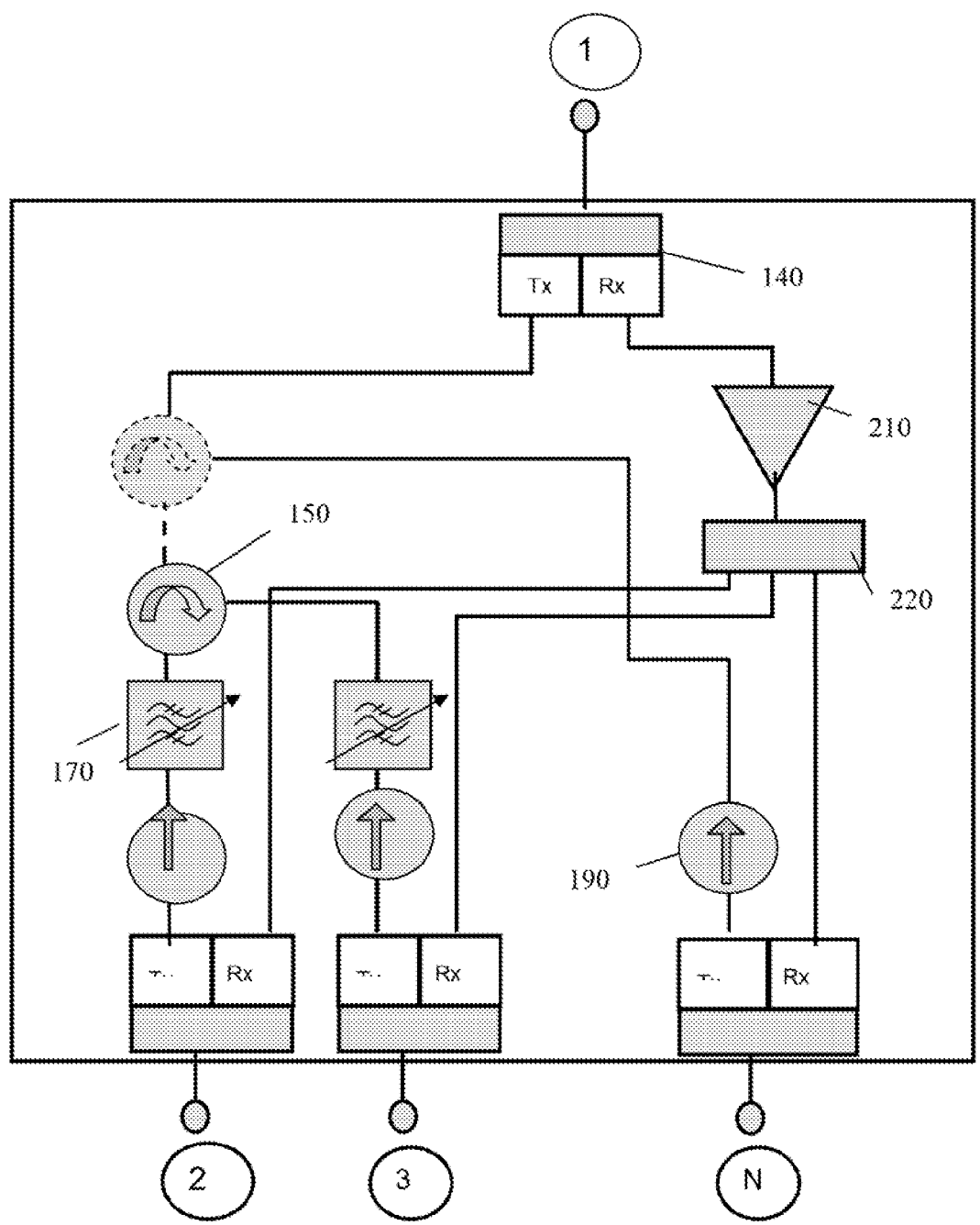
FIG. 6 illustrates another embodiment which uses circulators instead of the reactive combiner, in accordance with one embodiment.

FIG. 6 illustrates another embodiment which uses circulators instead of the reactive combiner. This arrangement needs N−1 number of band pass filters, where N is the number of combined BTS transceivers at the collocated site.

For the arrangement described in FIG. 6, multiple BTS transceivers are shown to be combined using circulators as combining elements. In this embodiment, the Tx signal from $N_{th}$ BTS must propagate twice through (N−1) circulators, therefore the insertion loss of the selected type of circulators and the number of connected BTS transceivers plays a decisive role in embodiment type selection. In the configuration demonstrated in FIGS. 6 and 7, the low loss combiner (LLC) 100 has multiple external ports from 1 to N shown in encircled numbers. External port 1 is common port, where all signals from collocated BTS are combined. Individual ports 2 to N used for interface with plurality of collocated BTS's.

The Tx/Rx ports of each BTS is connected to one of the individual input ports of LLC 100 from 2 to N, which direct the Tx/Rx signals to N−1 broad band identical duplexers 190 for separate transmit and receive signal processing. These duplexers can be of identical design, covering the full operating band for the collocated BTS's and must withstand the average and peak power of a single BTS.

The Tx signal(s) from the BTS appears on one of the two output ports of duplexers 190 directed to the input ports of isolators 160. The Isolators provide additional protection to BTS from the leakage of the signals from other BTS's. They also serve the role of providing a constant impedance load for the BTS and provide protection from reflected signals in case of an antenna, malfunction.

The Tx signal(s) are directed to the Band Pass filters 170, with the center frequency and pass band equal to the center frequency and bandwidth of the Tx signal(s) of the corresponding BTS. Filters 170 must have steep rejection characteristic for all frequencies located out of the pass band. They can be field tunable type or factory pre-tuned to fixed frequencies.

Port 2 of each filter 170 is connected to circulators 150. Circulators are connected in series with each other with their number equal to N−1, where N is the number of BTS's. The low loss path orientation in the circulator is clock-wise with signals entering port 1 directed to port 2, and signals entering port 3 directed to port 1. The Tx signals from the Band Pass Filters enter port 3 of the circulators, which have a low loss path to port 1. Then, the signal from $i_{th}$ BTS (i=2, ... N) will enter (i−1) filter through the direct path between ports 1 and 3 of the circulator and will be reflected by the (i−1) filter, which is tuned to pass only $(i-1)_{th}$ BTS operating frequencies. This reflected signal reverses the direction of propagation and enters the $(i-1)_{th}$ circulator from port 1. There are (i) signals coming out from port 2 of the $(i-1)_{th}$ circulator. A similar process is repeated for all N transmit signals, thus realizing the multiplexing properties of the module. The combined power from all collocated BTS's comes out from the port 2 of the $(N-1)_{th}$ circulator and enters the Tx port of the high power duplexer 140. This duplexer can also cover the same frequencies as duplexers 190 but must survive combined average and peak power from all BTS's. The combined signal will ultimately appear at the common port of the duplexer 190 and will be transmitted to the external antenna.

In this embodiment circulators play an important role and must posses good isolating properties no less than 20 dB, which limit combining losses to 1%. The operating power of the circulator is preferably equal to or more than the combined power of the BTSTx signals passing through the specific circulator. As it can be appreciated by those skilled in the art, the optimum insertion loss and lowest cost can be obtained when there are just two BTS transceivers (N=2).

FIG. 6 also shows the distribution of the receive signal entering from antenna into a common port of duplexer 190 and separated at the Rx port of this duplexer. The Rx port of duplexer 190 is connected to the input port of Low Noise Amplifier (LNA) 210. After amplification with the gain no less than the order of power divider, which typically equals to the number of collocated BTS, signal is split between N outputs of power divider. Each output is connected to the Rx port of duplexers 190, which direct them to the common ports of the duplexers and then to the corresponding BTS.

Figure 7:
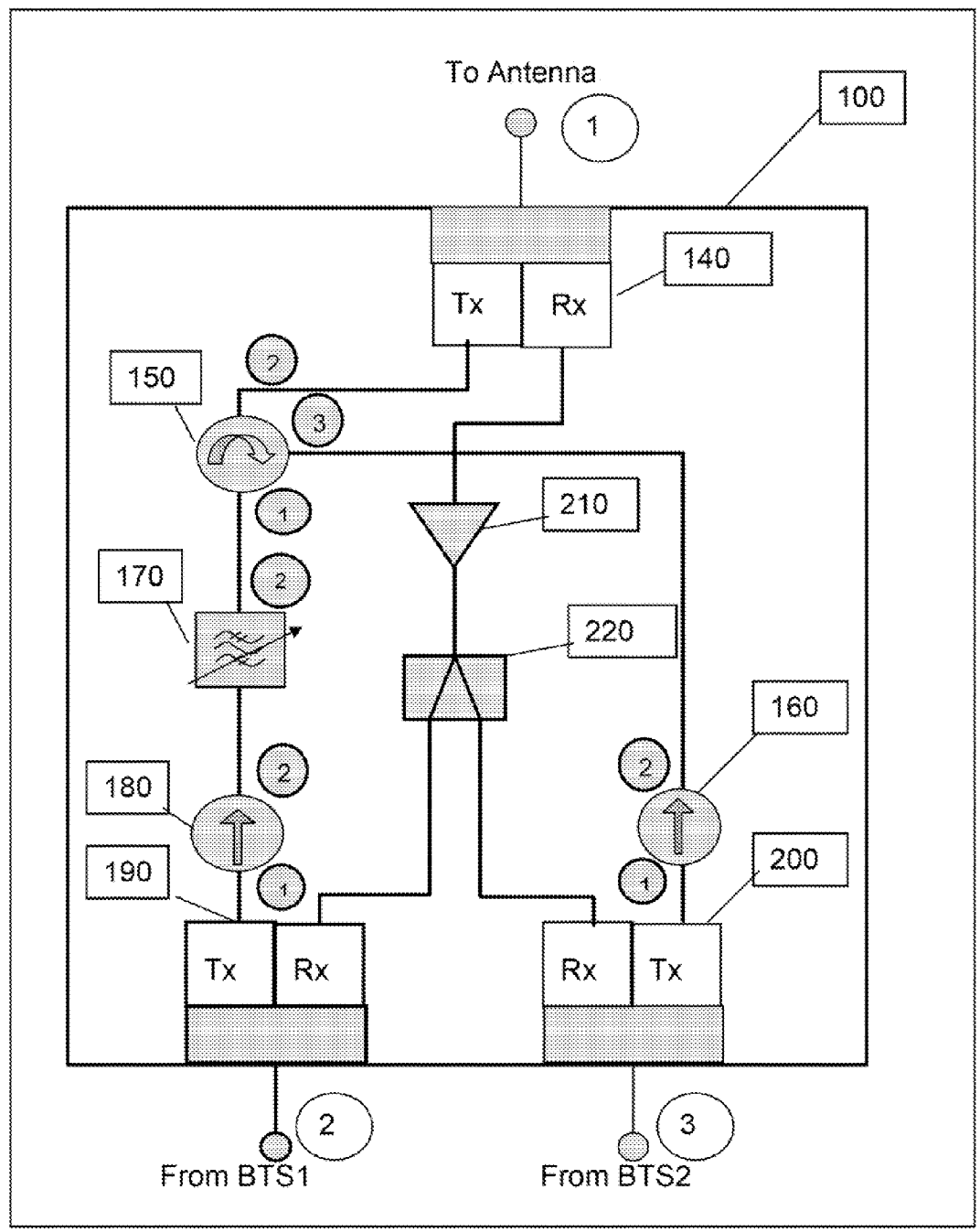
FIG. 7 shows an LLC configuration with circulator for the case N=2, in accordance with one embodiment.

FIG. 7 shows an LLC configuration with circulator for the case N=2. It illustrates a wireless communication system with two BTS transceivers collocated on the same site. The system includes a multiplexer module LLC 100 that allows operation of BTS' and BTS2 on the same antenna. In this configuration, the Tx/Rx port of BTS 1 and Tx/Rx port of BTS2 are connected to two input ports 2 and 3 correspondingly of the 3-port LLC 100. The output port 1 of the LLC 100 contains the two Tx and Rx signals from both BTS transceivers and is connected externally to a common antenna. As shown in FIG. 7, the external interface 1 of the module 100 is internally connected to duplexer 140 and external interface 2 of the module 100 is connected internally to duplexer 190, and external interface 3 of the module 100 is connected internally to duplexer 200. FIG. 7 also shows the distribution of the receive signals Rx coming from the duplexer 140. The receive signals enter the input port of LNA 210, and are then split by the power divider 220 to the Rx port of duplexer 190 and the Rx port of duplexer 200.

A typical duplexer separates two signals in the frequency domain present on one terminal into two outputs, one for each frequency band. This device allows independent processing of signals in each band. Duplexers are reciprocal devices and can be used to combine corresponding bands into one terminal. This invention deploys duplexers that cover standard frequency bands designated for receive and transmit in wireless systems using FDM (Frequency Division Multiplexing) method.

The Tx/Rx signals from BTS1 enter the common port of duplexer 190 and come out on two different ports of the duplexer for separate processing. The Tx signal from the duplexer enters port 1 of the isolator 180 oriented for forward propagation. Exiting from port 2 of isolator 180, the signals from BTS1 enter port 1 of the Band Pass filter 170, which is tuned to the center frequency of the Tx signal from BTS1 and has a pass band limited to the bandwidth of the Tx signal from BTS1. Upon exiting from port 2 of the Band Pass filter 170, the Tx signal enters port 1 of circulator 150 which is oriented for clock-wise propagation. Circulator 150 directs all signals coming to port 1 to port 2 and from port 3 to port 1 of the circulator. Port 2 of the circulator will direct the Tx signal from BTS1 to the Tx port of Duplexer 140, which n turn, directs the signal to the externally connected common antenna. The interconnections of the components as described above provides for low loss propagation of the signals from BTS1 to the common antenna.

Tx signals entering the module from port 2 which is externally connected to BTS2 enter the common port of duplexer 200 and come out at two different ports of the duplexer for separate processing. The Tx signals from duplexer 200 enters port 1 of isolator 160 oriented in the forward direction, providing low loss propagation of these signals to port 3 of the circulator 150. Because of the clock-wise signal propagation of this circulator, all signals entering port 3 will be directed to port 1 of said circulator and will enter port 2 of the band pass filter 170. Since the band pass filter is tuned to pass the Tx signals from BTS1 and reject signals from BTS2, the BTS2 transmit signal will be reflected from port 2 of the filter 170, and will be directed back to port 1 of the circulator 150 where it will be directed to port 2 of said circulator because of its clock-wise propagation orientation. Similarly to the signals from BTS1, signals from BTS2 will be directed to Tx port of duplexer 140 and subsequently emitted from the common antenna externally connected to port 1. The antenna is typically a broad band device and provides low VSWR at all frequencies of operation for BTS1 and BTS2.

The system described in this paragraph is an example of the application of LLC for small number of collocated BTS. For this case the second embodiment is recommended where the number of required filters is equal to N−1. For the two-BTS site shown in FIG. 7, only one band pass filter is required. Uni-directional properties of circulator 150 do not allow any signals from port 1 of the circulator appear at port 3 (except in case of antenna malfunctioning), therefore there is no need for the filter in BTS 2 path.

The following section provides the theoretical analysis of the operation of a 3-port LLC.

The operation of the combiner for two Tx signals in matrix notation can be described as $$\begin{pmatrix} O_1 \\ O_2 \end{pmatrix} = \begin{pmatrix} I_1 \\ I_2 \end{pmatrix} \begin{pmatrix} T_1 \\ T_2 \end{pmatrix} \tag{6}$$

Where $O_1$ is the Tx output signal originated from BTS1;
$O_2$ is the Tx output signal originated from BTS2;
$I_1$ is the Tx input signal from BTS1;
$I_2$ is the Tx input signal from BTS2;
T is the transmission function;

From scattering matrix for S-parameters of the 3-port device the following matrix of algebraic representation follows $$\begin{pmatrix} b_1 \\ b_2 \\ b_3 \end{pmatrix} = \begin{pmatrix} S_{11} & S_{12} & S_{13} \\ S_{22} & S_{21} & S_{23} \\ S_{33} & S_{31} & S_{32} \end{pmatrix} \begin{pmatrix} a_1 \\ a_2 \\ a_3 \end{pmatrix} \quad (7)$$

Where $b_1$, $b_2$, and $b_3$ are voltage responses to incident voltages $a_1$, $a_2$, and $a_3$ at corresponding ports of the LLC.

Using the detailed drawings of the embodiment shown in FIG. 7, in order to combine the two signals and eliminate coupling between ports 1 and 2 (provide maximum isolation between BTS1 and BTS2) and considering that there is no incoming Tx signal into port 3, matrix (7) becomes $$\begin{pmatrix} b_1 \\ b_2 \\ 0 \end{pmatrix} = \begin{pmatrix} S_{11} & 0 & S_{13} \\ S_{22} & 0 & S_{23} \\ S_{33} & S_{31} & S_{32} \end{pmatrix} \begin{pmatrix} a_1 \\ a_2 \\ 0 \end{pmatrix} \quad (8)$$

Assuming a perfectly matched network and infinite isolation provided by nonreciprocal devices with low loss direction oriented as indicated in FIG. 7, combining the parameters of matrix systems (1) and (3) the following relationships can be obtained:

$$O_1 = b_1^2, O_2 = b_2^2,$$

$$I_1 = a_1^2, I_2 = a_2^2, T_1 = S_{31}^2, T_2 = R; \quad (9)$$

where R is the power reflection coefficient of filter which serves as a band-pass filter for frequencies of operation of BTS1, and as a band-stop filter for frequencies of operation of BTS2.| As equation (9) shows, the transmission coefficient T is determined by the reflection coefficient R, which is actually the rejection value provided by the filter to undesirable frequency of BTS 2. The higher the value of rejection provided by the filter, the lower the combining loss for BTS 2.

Figure 8:
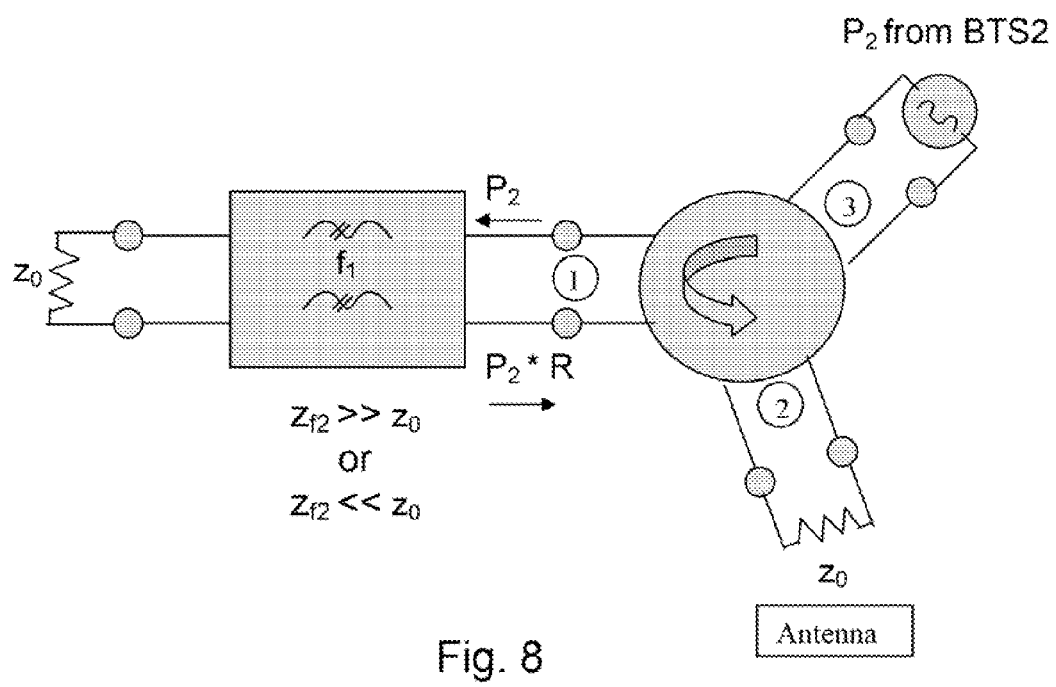
FIG. 8 shows the block diagram of the path for the Tx signal from BTS2, in accordance with one embodiment.

FIG. 8 shows the block diagram of the path for the Tx signal from BTS2. Using the same notations as in previous diagrams, the signal from BTS2 with power $P_2$ enters port 3 of circulator 150 and will be directed to port 1 of the circulator 150 connected to the band-pass filter 170. In this case, the transmission coefficient of this transducer can be described by the equation:

$$T_2 = |\Gamma_1|^2 = (Z_{f2} - Z_0)/(Z_{f2} + Z_0), \quad (10)$$

where $Z_{f2}$ is the complex impedance of the load presented by the filter 170 with pass band at f, at the terminals of the circulator 150 for the BTS2 frequency $f_2$. As one can see from equation (10), for an ideal system without losses, if $Z_{f2}$ will differ significantly from $Z_o$, then transmission coefficient will come close to $T_2 = |\Gamma_1|^2 = 1$. $Z_{f2}$ is the impedance presented by the first filter to the signal of BTS 2 operating at frequency $f_2$. FIG. 8 shows that in order to have low combining loss (or high transmission coefficient) the reflection coefficient for $f_2$ must be as high as possible, which is controlled by the value of $Z_{f2}$. In this case $P_2 * R \approx P_2$ because $R \approx 1$, where $P_2$ is the transmit power from BTS 2 and R is the reflection coefficient of the filter at frequency $f_2$.

Typically, the available frequency spectrum is very limited and the need to locate two BTS operating bands as close as possible is highly desirable. In this case, the sharpness of the filter frequency characteristic is important. It determines the amount of reflection (and insertion loss) that the second BTS signals will experience. The highest rejection with a given number of resonators at a given frequency offset is provided by elliptical and/or Chebyshev filters, where there are nulls and polls at the rejection band. As an example of a possible implementation, the equation for the transmission coefficient of the LLC with a circulator using a Chebyshev second type band pass filter with six resonators is shown below $$T3(k) := 10 \log \left[ \frac{1}{\left[ 1 + \frac{1}{a(r)^2 \left( Ucheb\left(6, \frac{1}{k}\right)\right)^2} \right]^{-2}} \right]; \quad (11)$$

where a(r) is the selectivity parameter;
Ucheb is the Chebyshev polynomial function second type of the $6^{th}$ order;
$k = \omega/\omega_0$;
$\omega_0$ = pass band corner frequency.

Figure 9:
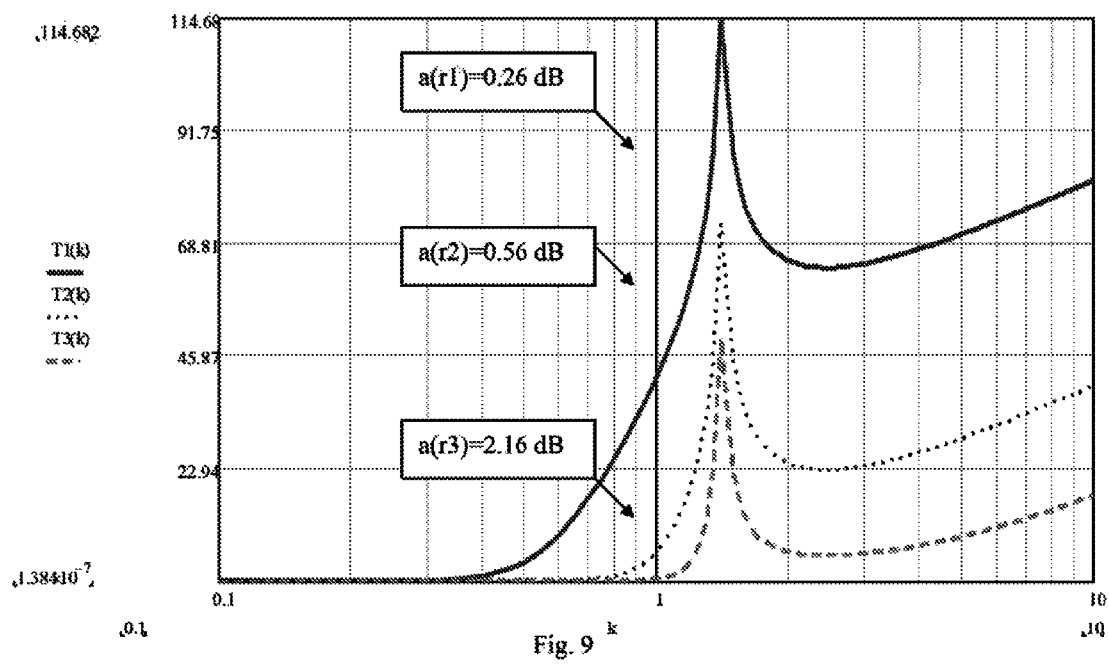
FIG. 9 shows charts for three levels of selectivity, where a(r1)=0.26 dB, a(r2)=0.56 dB, a(r3)=2.16 dB. a(r) denotes "selectivity" parameter or the sharpness of the rejection slope, in accordance with one embodiment.

The charts in FIG. 9 are shown for three levels of selectivity, where a(r1)=0.26 dB, a(r2)=0.56 dB, a(r3)=2.16 dB. a(r) denotes "selectivity" parameter or the sharpness of the rejection slope.

With proper selection of the filter type and its parameters, the propagation coefficient can be made no less than T>0.9 for the second BTS operating at frequencies within a few percent from the BTS1 pass band.

The terms Propagation Coefficient and Transmission Coefficient (T) are used interchangeably herein Physical meaning behind this term can be expressed by:

$$T_1 = P_1^{out}/P_1^{in} \text{ and } T_2 = P_2^{out}/P_2^{in}, \text{ where}$$

$P_1^{out}$ is the output power of the BTS1;
$P_1^{in}$ is the input power of the BTS1;
$P_2^{out}$ is the output power of the BTS2;
$P_2^{in}$ is the input power of the BTS2.

Thus, a dual band LTE and CDMA low loss combiner can be made in a very compact, efficient and cost effective manner. Since the systems and methods described herein are not limited to particular implementations or to any specific communication bands, it should be apparent that there can be many more embodiments and implementations within the scope of this invention. Accordingly, the invention is not restricted, except in light of claims and their equivalents.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:

1. A system for combining a plurality of signals in a wireless communication device, said system comprising:
a plurality of base station duplexers each coupled to a corresponding base station from a plurality of collocated base stations each base station capable of simultaneously receiving and transmitting signals in accordance with a corresponding transmission protocol;
wherein each duplexer includes transmit and receive paths for allowing signals to be transmitted from the base station and further allowing signals to be received by the base station in accordance with different protocols;
isolators, including ferrite broad band isolators, exhibiting at least a 20 dB isolation, each coupled to a corresponding one of said transmit path of each of said duplexers;
bandpass filters, each coupled to an output port of a corresponding one of said isolator, and each exhibiting high impedance, with substantially an open circuit characteristic, at rejection frequencies, configured to tune with a center frequency and a band pass range that is substantially equal to the center frequency and bandwidth of the transmitted signal;

a combiner for receiving signals provided by each one of said band pass filters; and an antenna duplexer coupled to an output port of said combiner via a transmit path, said duplexer providing a combined signal of said collocated base stations to an antenna, said duplexer further including a receive path for providing signals received by said antenna to a corresponding receive path of each of said base station duplexers.

2. The system in accordance with claim 1, wherein said isolators are connected to a Chebyscheff or elliptic function filter.

3. The system in accordance with claim 1, wherein said filters exhibiting high impedance are interdigital printed circuit type filters.

4. The system in accordance with claim 1, wherein a transmission line connecting said band pass filters to said combiner has an electrical length substantially equal to an even number of quarter wavelength of a corresponding filter.

5. A system for combining a plurality of signals in a wireless communication device, said system comprising:
a plurality of base station duplexers each coupled to a corresponding base station from a plurality of collocated base stations each base station capable of simultaneously receiving and transmitting signals in accordance with a corresponding transmission protocol;
wherein each duplexer includes transmit and receive paths for allowing signals to be transmitted from the base station and further allowing signals to be received by the base station in accordance with different protocols;
isolators, including ferrite broad band isolators, exhibiting at least a 20 dB isolation, each coupled to a corresponding one of said transmit path of each of said duplexers;
bandpass filters, each coupled to an output port of a corresponding one of said isolator and each exhibiting low impedance, with substantially a short circuit characteristic, at rejection frequencies, configured to tune with a center frequency and a band pass range that is substantially equal to the center frequency and bandwidth of the transmitted signal;
a combiner for receiving signals provided by each one of said band pass filters; and
an antenna duplexer coupled to an output port of said combiner via a transmit path, said duplexer providing a combined signal of said collocated base stations to an antenna, said duplexer further including a receive path for providing signals received by said antenna to a corresponding receive path of each of said base station duplexers.

6. The system in accordance with claim 5, wherein said filters exhibiting low impedance are cavity type filters with impedance close to a short circuit.

7. The system in accordance with claim 5, wherein a transmission line connecting said band pass filters to said combiner has an electrical length substantially equal to an odd number of quarter wavelength of a corresponding filter.

8. A system for combining a plurality of signals in a wireless communication device, said system comprising:
a plurality of base station duplexers each coupled to a corresponding base station from a plurality of collocated base stations each base station capable of simultaneously receiving and transmitting signals in accordance with a corresponding transmission protocol;
wherein each duplexer includes transmit and receive paths for allowing signals to be transmitted from the base station and further allowing signals to be received by the base station in accordance with different protocols;
isolators, including ferrite broad band isolators, exhibiting at least a 20 dB isolation, each coupled to a corresponding one of said transmit path of each of said duplexers;
a plurality of bandpass filters each coupled to an output port of a corresponding one of said isolators, and each exhibiting high impedance, with substantially an open circuit characteristic, at rejection frequencies, each configured to tune with a center frequency and a band pass range that is substantially equal to the center frequency and bandwidth of the transmitted signal;
a plurality of circulators coupled in series, wherein each circulator is configured to receive signals from two of said band pass filters; and
an antenna duplexer coupled to an output port of one of said circulators via a transmit path, said duplexer providing a combined signal of said collocated base stations to an antenna, said duplexer further including a receive path for providing signals received by said antenna to a corresponding receive path of each of said base station duplexers.

9. The system in accordance with claim 8, wherein the number of said band pass filters is one less than the number of said isolators.

10. The system in accordance with claim 9 wherein an output port of the last circulator in said series of coupled circulators is coupled to said antenna via said antenna duplexer.

11. The system in accordance with claim 8, having a plurality of circulators coupled in series, providing an arrangement for combination of signals from all base stations.

12. The system in accordance with claim 11, wherein first one of said base stations operate in LTE mode and second one of said base stations operate in CDMA mode.

13. A system for combining a plurality of signals in a wireless communication device, said system comprising:
a plurality of base station duplexers each coupled to a corresponding base station from a plurality of collocated base stations each base station capable of simultaneously receiving and transmitting signals in accordance with a corresponding transmission protocol;
wherein each duplexer includes transmit and receive paths for allowing signals to be transmitted from the base station and further allowing signals to be received by the base station in accordance with different protocols;
isolators, including ferrite broad band isolators, exhibiting at least a 20 dB isolation, each coupled to a corresponding one of said transmit path of each of said duplexers;
a plurality of bandpass filters each coupled to an output port of a corresponding one of said isolators, and each exhibiting low impedance, with substantially a short circuit characteristic, at rejection frequencies, each configured to tune with a center frequency and a band pass range that is substantially equal to the center frequency and bandwidth of the transmitted signal;
a plurality of circulators coupled in series, wherein each circulator is configured to receive signals from two of said band pass filters; and
an antenna duplexer coupled to an output port of one of said circulators via a transmit path, said duplexer providing a combined signal of said collocated base stations to an antenna, said duplexer further including a receive path for providing signals received by said antenna to a corresponding receive path of each of said base station duplexers.

* * * * *